(12) United States Patent
Tsukiyama et al.

(10) Patent No.: US 11,492,922 B2
(45) Date of Patent: Nov. 8, 2022

(54) TURBOCHARGER

(71) Applicants: TOYOTA JIDOSHA KABUSHIKI KAISHA, Toyota (JP); KABUSHIKI KAISHA TOYOTA JIDOSHOKKI, Kariya (JP)

(72) Inventors: Takashi Tsukiyama, Toyota (JP); Tsuyoshi Uesugi, Kariya (JP)

(73) Assignees: TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/520,265

(22) Filed: Nov. 5, 2021

(65) Prior Publication Data

US 2022/0145773 A1 May 12, 2022

(30) Foreign Application Priority Data

Nov. 9, 2020 (JP) .............................. JP2020-186444

(51) Int. Cl.
*F02B 37/24* (2006.01)
*F01D 17/16* (2006.01)
*F02C 6/12* (2006.01)

(52) U.S. Cl.
CPC ............ *F01D 17/165* (2013.01); *F02B 37/24* (2013.01); *F02C 6/12* (2013.01); *F05D 2220/40* (2013.01); *F05D 2240/60* (2013.01); *F05D 2260/38* (2013.01)

(58) Field of Classification Search
CPC ........ F01D 17/165; F01D 25/14; F02B 37/24; F02C 6/12; F05D 2220/40; F05D 2240/60; F05D 2260/38; F05D 2260/20; Y02T 10/12
See application file for complete search history.

(56) References Cited

U.S. PATENT DOCUMENTS

2018/0238190 A1* 8/2018 Ikeda .................... F02B 37/24

FOREIGN PATENT DOCUMENTS

| JP | 2009-524773 A | 7/2009 |
|---|---|---|
| JP | 2020-076328 A | 5/2020 |
| JP | 2020-516807 A | 6/2020 |
| WO | 2007/111759 A2 | 10/2007 |
| WO | 2018/191214 A1 | 10/2018 |

\* cited by examiner

*Primary Examiner* — Audrey B. Walter
*Assistant Examiner* — Edward Bushard
(74) *Attorney, Agent, or Firm* — Oliff PLC

(57) ABSTRACT

A turbocharger includes a turbine wheel, a turbine housing, a bearing housing, a compressor housing, a seal plate, a variable nozzle mechanism, a penetrating shaft, and a spring member. The variable nozzle mechanism is located within the turbine housing, and adjusts the amount of exhaust gas that flows toward the turbine wheel. The penetrating shaft extends through the bearing housing and is connected to the variable nozzle mechanism. The spring member pushes out the penetrating shaft toward the compressor housing. The bearing housing and the seal plate define a cooling chamber through which coolant flows. The spring member is located in the cooling chamber.

9 Claims, 5 Drawing Sheets

TURBOCHARGER

CROSS-REFERENCE TO RELATED APPLICATION

This application claims priority to Japanese Patent Application No. 2020-186444 filed on Nov. 9, 2020, incorporated herein by reference in its entirety.

BACKGROUND

1. Technical Field

The disclosure relates to a turbocharger.

2. Description of Related Art

A turbocharger described in Japanese Unexamined Patent Application Publication No. 2020-076328 (JP 2020-076328 A) includes a turbine housing, a bearing housing, a seal plate, a compressor housing, and a turbine wheel. The turbine housing houses the turbine wheel. The bearing housing is fixed to the turbine housing. The compressor housing is fixed to the bearing housing. The seal plate is located between the bearing housing and the compressor housing.

The turbocharger described in JP 2020-076328 A also includes a variable nozzle mechanism, penetrating shafts, and spring members. The variable nozzle mechanism is located within the turbine housing. The variable nozzle mechanism adjusts the amount of exhaust gas flowing toward the turbine wheel. The penetrating shafts extend through the bearing housing. A first end of each of the penetrating shafts is connected to the variable nozzle mechanism. A second end of the penetrating shaft is located between the bearing housing and the seal plate. The spring member is mounted at the second end of the penetrating shaft. The spring member pushes out the penetrating shaft toward the compressor housing. With this arrangement, the variable nozzle mechanism is positioned in the turbine housing.

SUMMARY

In the turbocharger as described in JP 2020-076328 A, heat is transferred from the turbine housing to the seal plate via the bearing housing and the penetrating shafts. Accordingly, it is preferable to provide a cooling chamber through which coolant flows, for cooling the penetrating shafts, seal plate, etc. However, in order to provide the cooling chamber, it is necessary to design the seal plate and the compressor housing in sizes large enough to define the cooling chamber, which may result in increase in the size of the turbocharger.

One aspect of the disclosure is concerned with a turbocharger including a turbine wheel, a turbine housing, a bearing housing, a compressor housing, a seal plate, a variable nozzle mechanism, a penetrating shaft, and a spring member. The turbine wheel is configured to rotate by flow of exhaust gas. The turbine housing houses the turbine wheel. The bearing housing is fixed to the turbine housing. The compressor housing is fixed to the bearing housing. The seal plate is located between the bearing housing and the compressor housing. The variable nozzle mechanism is located within the turbine housing, and is configured to adjust the amount of the exhaust gas that flows toward the turbine wheel. The penetrating shaft extends through the bearing housing and is connected to the variable nozzle mechanism. The spring member is configured to push out the penetrating shaft toward the compressor housing. The bearing housing and the seal plate are configured to define a cooling chamber through which a coolant flows. The spring member is located in the cooling chamber.

In the turbocharger according to the above aspect, space that accommodates the spring member can be effectively utilized as the cooling chamber, thus eliminating a need to newly provide a cooling chamber in the compressor housing and seal plate. Accordingly, the turbocharger is less likely or unlikely to be large-sized, as compared with the case where the cooling chamber and the space that accommodates the spring member are provided separately.

In the turbocharger according to the above aspect, the spring member may be a coiled wave spring. Generally, the axial dimension of the coiled wave spring is smaller than the axial dimension of a coil spring, for example. Also, generally, change of force according to the amount of elastic deformation of the coiled wave spring is smaller than that of a disc spring, for example; therefore, the force applied to an object can be easily adjusted. Accordingly, with the above arrangement, it is possible to curb increase in the size of the turbocharger, in the axial direction of the coiled wave spring, while assuring sufficiently large force applied from the coiled wave spring to the penetrating shaft.

In the turbocharger as described above, a plurality of penetrating shafts may be provided on a circumference about a rotation axis of the turbine wheel, and the coiled wave spring may surround the rotation axis, and may be configured to push out all of the penetrating shafts toward the compressor housing. Then, all of the penetrating shafts may be positioned to be spaced equiangularly in a circumferential direction about the rotation axis.

In the turbocharger thus constructed, all of the penetrating shafts can be pushed out by a single coiled wave spring; therefore, increase in the number of components is curbed. Also, since a large diameter can be ensured as the diameter of the coiled wave spring, sufficient elastic force of the coiled wave spring can be easily ensured.

In the turbocharger according to the above aspect, the bearing housing may include a through-hole through which the penetrating shaft is inserted, and a seal member that seals a clearance between the penetrating shaft and the through-hole may be located between an outer circumferential surface of the penetrating shaft and an inner circumferential wall of the through-hole. With this arrangement, it is possible to reduce the amount of exhaust gas that flows from the turbine housing to the compressor housing, via a clearance between the outer circumferential surface of the penetrating shaft and the inner circumferential wall of the through-hole.

In the turbocharger constructed as described above, the bearing housing may be configured to define a holding space that holds the seal member, and the holding space may communicate with the cooling chamber. The cooling chamber may have a generally annular shape. With the turbocharger thus constructed, the holding space communicates with the cooling chamber, so that the seal member is easily cooled by heat exchange with the coolant flowing through the cooling chamber.

In the turbocharger constructed as described above, a holding plate that holds the seal member may be mounted on the bearing housing, and the seal member may be sandwiched between an inner wall of the holding space and an end face of the holding plate. With the turbocharger thus constructed, the seal member abuts against the holding plate, so that the seal member is prevented from being displaced to be closer to the compressor housing.

In the turbocharger according to the above aspect, the compressor housing may house a compressor wheel connected to the turbine wheel, and at least a part of the cooling chamber may be located outward of the compressor wheel, in a radial direction perpendicular to a rotation axis of the turbine wheel. With the turbocharge thus constructed, the temperature of a portion of the seal plate located radially outward of the compressor wheel is made less likely or unlikely to be elevated, due to heat exchange with the coolant that flows through the cooling chamber.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Referring to FIG. 1 to FIG. 5, one embodiment as one example of the disclosure will be described. Initially, the schematic construction of an internal combustion engine 10 of a vehicle in which a turbocharger 20 of the disclosure is used will be described.

Figure 1:
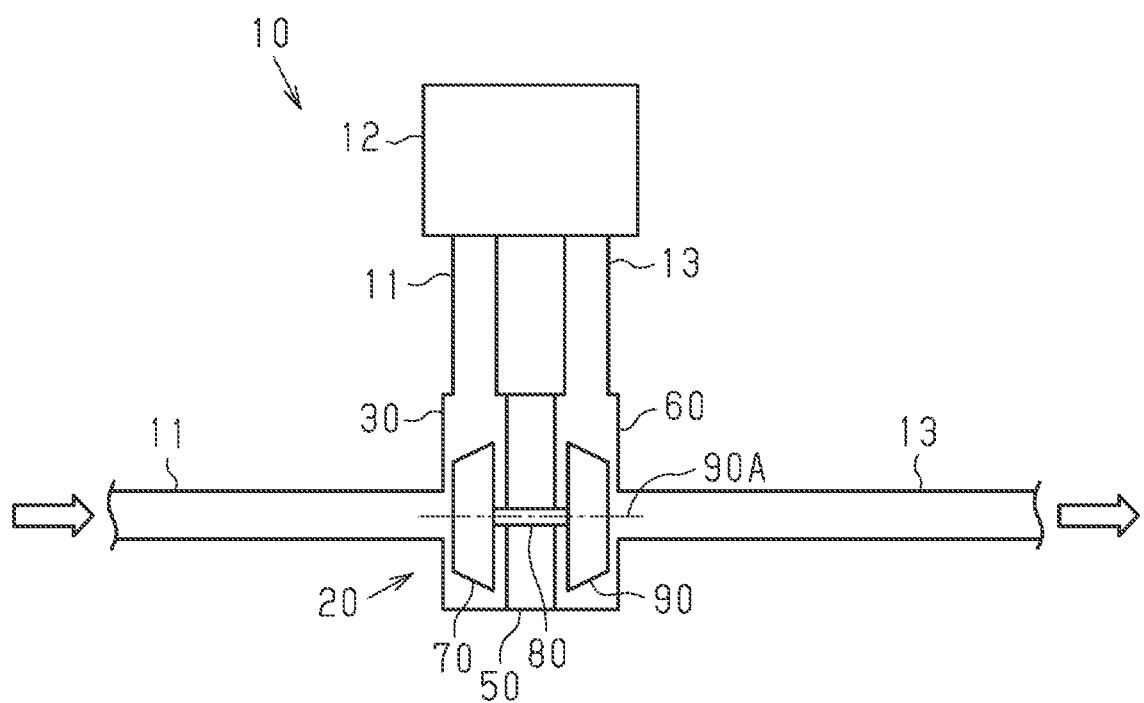
FIG. 1 is a schematic view of an internal combustion engine in which a turbocharger as one embodiment of the disclosure is installed.

As shown in FIG. 1, the internal combustion engine 10 includes an intake passage 11, cylinder 12, exhaust passage 13, and turbocharger 20. The intake passage 11 allows intake air to be introduced from the outside of the internal combustion engine 10. The cylinder 12 is connected to the intake passage 11. In the cylinder 12, fuel and intake air are mixed and burned. The exhaust passage 13 is connected to the cylinder 12. The exhaust passage 13 allows exhaust gas to be discharged from the cylinder 12.

The turbocharger 20 includes a compressor housing 30, seal plate 40, bearing housing 50, turbine housing 60, compressor wheel 70, connecting shaft 80, and turbine wheel 90.

The compressor housing 30 is mounted in the intake passage 11. The turbine housing 60 is mounted in the exhaust passage 13. The bearing housing 50 is fixed to the compressor housing 30 and the turbine housing 60, respectively, and connects the compressor housing 30 with the turbine housing 60. Thus, the turbocharger 20 extends across the intake passage 11 and the exhaust passage 13. While the seal plate 40 is located between the bearing housing 50 and the compressor housing 30, the seal plate 40 is not illustrated in FIG. 1.

The turbine housing 60 houses the turbine wheel 90. The bearing housing 50 houses the connecting shaft 80. The bearing housing 50 rotatably supports the connecting shaft 80 via a bearing (not shown). A first end of the connecting shaft 80 is connected to the turbine wheel 90. The compressor housing 30 houses the compressor wheel 70. The compressor wheel 70 is connected to a second end of the connecting shaft 80. Namely, the compressor wheel 70 is connected to the turbine wheel 90 via the connecting shaft 80.

When the turbine wheel 90 rotates by flow of exhaust gas inside the turbine housing 60, the compressor wheel 70 rotates along with the turbine wheel 90 via the connecting shaft 80. With the compressor wheel 70 thus rotated, the intake air in the compressor housing 30 is compressed.

Next, the specific configuration of the turbocharger 20 will be described. In the following description, a direction along a rotation axis 90A as the center of rotation of the turbine wheel 90 will be abbreviated to "rotation-axis direction". Also, a direction perpendicular to the rotation axis 90A will be abbreviated to "radial direction".

Figure 2:
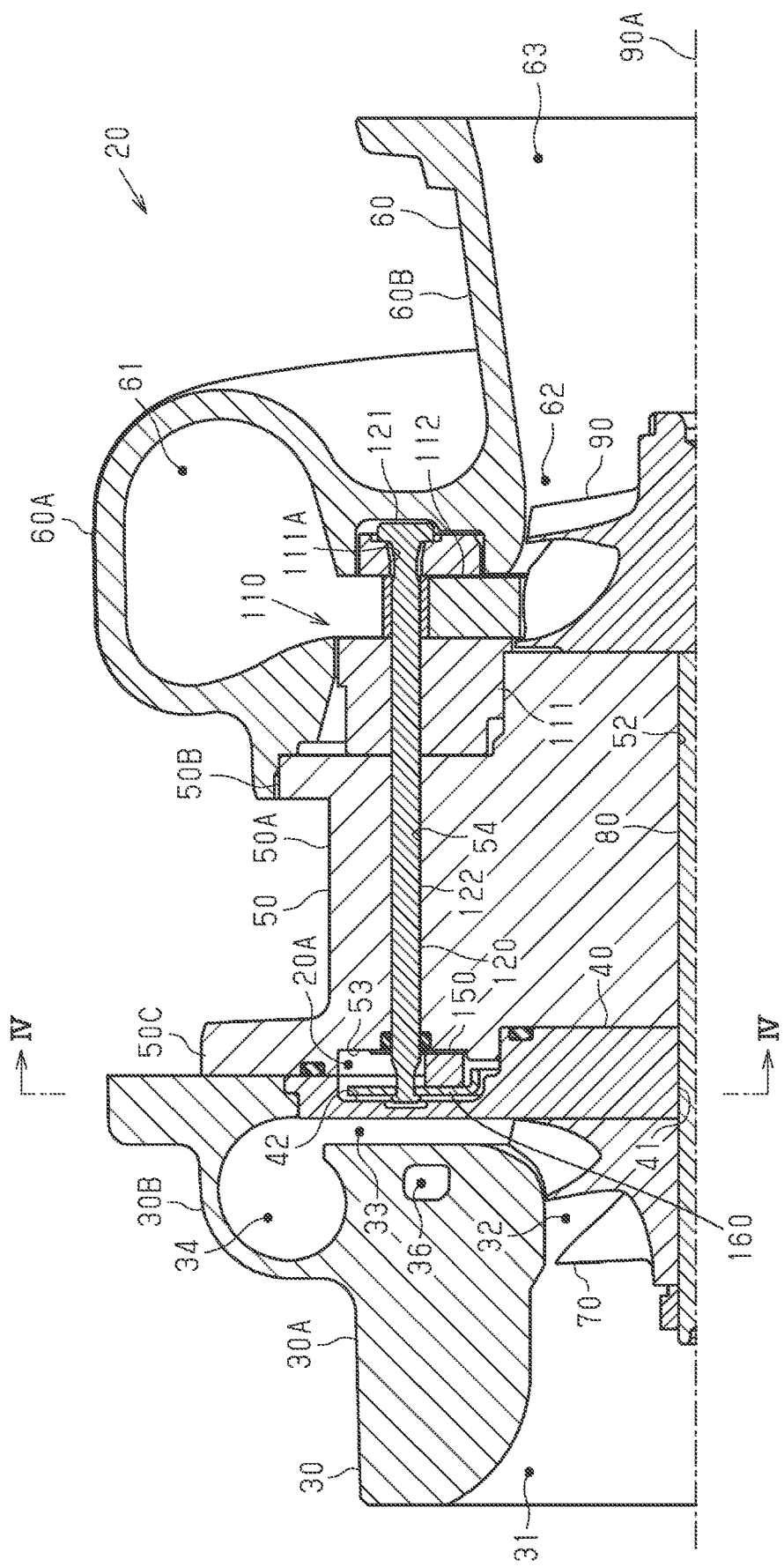
FIG. 2 is a cross-sectional view of the turbocharger.

As shown in FIG. 2, the turbine housing 60 includes an arc portion 60A and a cylindrical portion 60B. The cylindrical portion 60B has a generally cylindrical shape. The cylindrical portion 60B generally extends along the rotation axis 90A as the center of rotation of the turbine wheel 90. The arc portion 60A extends around the outer periphery of the cylindrical portion 60B, and has a generally arc-like shape.

The turbine housing 60 defines a scroll passage 61, housing space 62, and discharge passage 63, as space through which exhaust gas flows. The scroll passage 61 is located within the arc portion 60A and cylindrical portion 60B. The scroll passage 61 extends in a circumferential direction so as to surround the turbine wheel 90. The upstream end of the scroll passage 61 is connected to the exhaust passage 13 on the upstream side of the turbine housing 60. The downstream end of the scroll passage 61 is connected to the housing space 62. The housing space 62 is a part of the interior space of the cylindrical portion 60B in which the turbine wheel 90 is located. The housing space 62 is connected to the discharge passage 63. The discharge passage 63 is a part of the interior space of the cylindrical portion 60B, which includes an end opposite to the bearing housing 50, namely, the right end in FIG. 2. The downstream end of the discharge passage 63 is connected to the exhaust passage 13 on the downstream side of the turbine housing 60.

The turbocharger 20 includes a variable nozzle mechanism 110. The variable nozzle mechanism 110 is located within the scroll passage 61. The variable nozzle mechanism 110 includes a support member 111 and a plurality of nozzles 112. The support member 111 has a generally annular shape surrounding the turbine wheel 90. The support member 111 includes three insertion holes 111A. The insertion holes 111A extend through the support member 111 in the rotation-axis direction. The three insertion holes 111A are located on a circumference including a center on the rotation axis 90A. The three insertion holes 111A are spaced equiangularly in the circumferential direction about the rotation axis 90A. More specifically, the three insertion holes 111A are arranged at a pitch of 120 degrees. In FIG. 2, only one set of the insertion hole 111A and its related structure are illustrated.

The support member 111 supports the nozzles 112. The nozzles 112 are located so as to surround the turbine wheel 90. The nozzles 112 are operated by an actuator (not shown), so that their orientations relative to the turbine wheel 90 are changed. As a result, the direction and amount of exhaust gas flowing to the turbine wheel 90 are adjusted, and the rotational speed of the turbine wheel 90 is controlled.

The bearing housing 50 includes a housing body 50A, first flange 50B, and second flange 50C. The housing body 50A is a solid, generally cylindrical body. The first flange 50B protrudes from an outer circumferential surface of the housing body 50A. The first flange 50B is located on an end portion of the housing body 50A closer to the turbine housing 60. The first flange 50B is fixed to the arc portion 60A of the turbine housing 60. The second flange 50C protrudes from the outer circumferential surface of the housing body 50A. The second flange 50C protrudes from the entire circumference of the housing body 50A, and has a generally annular shape. The second flange 50C is located on an end portion of the housing body 50A closer to the compressor housing 30.

As shown in FIG. 2, the bearing housing 50 defines an insertion hole 52, recessed portion 53, and three through-holes 54. The insertion hole 52 extends through the housing body 50A in the rotation-axis direction. The insertion hole 52 is located on the central axis of the housing body 50A. The connecting shaft 80 is inserted through the insertion hole 52.

Figure 3:
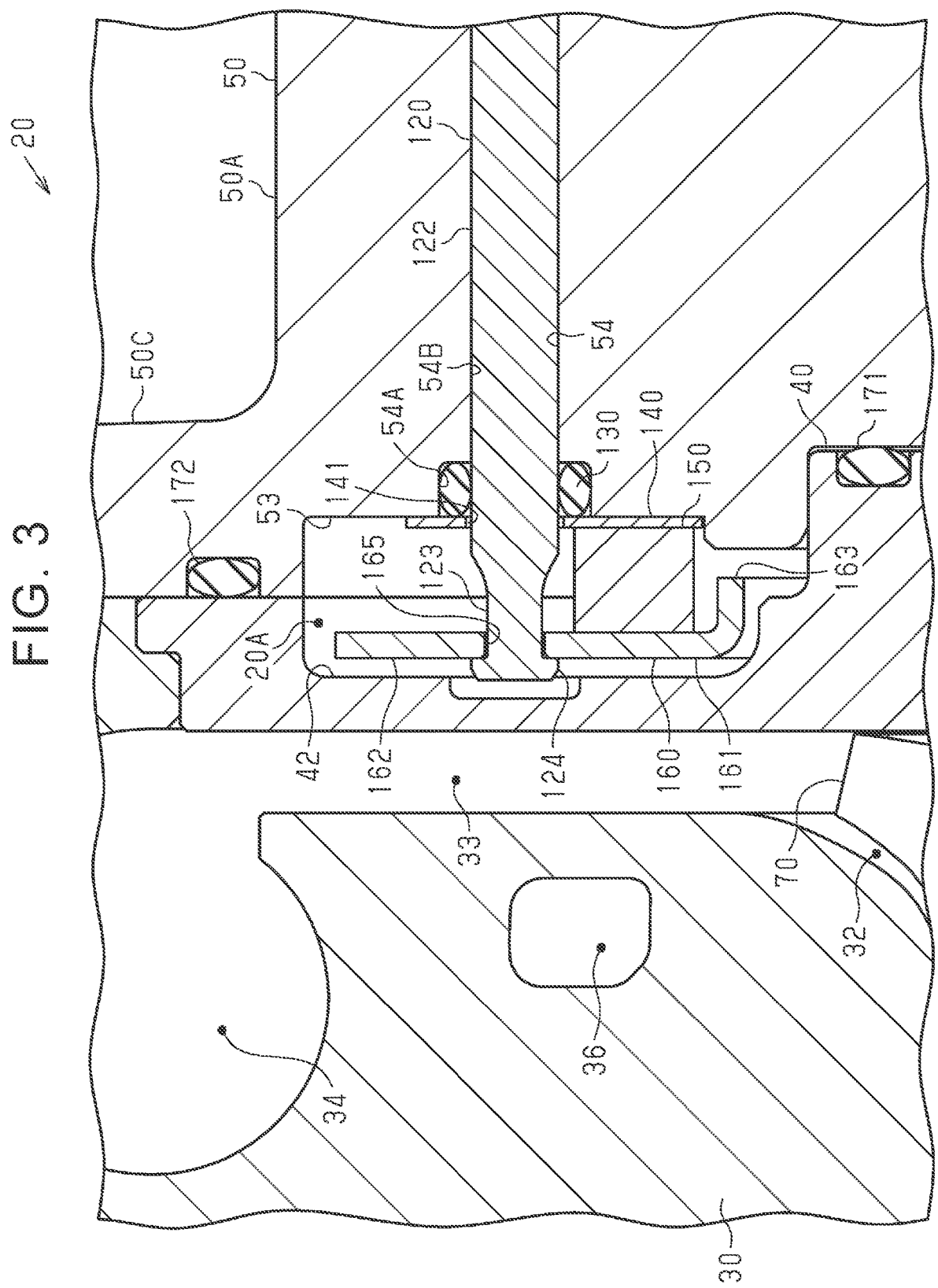
FIG. 3 is an enlarged cross-sectional view of FIG. 2.

As shown in FIG. 3, the recessed portion 53 is recessed from an end face of the housing body 50A closer to the compressor housing 30, toward the turbine housing 60. The recessed portion 53 has a generally annular shape surrounding the rotation axis 90A. When viewed in the rotation-axis direction, the recessed portion 53 is located in a portion that overlaps the three insertion holes 111A of the variable nozzle mechanism 110.

Figure 4:
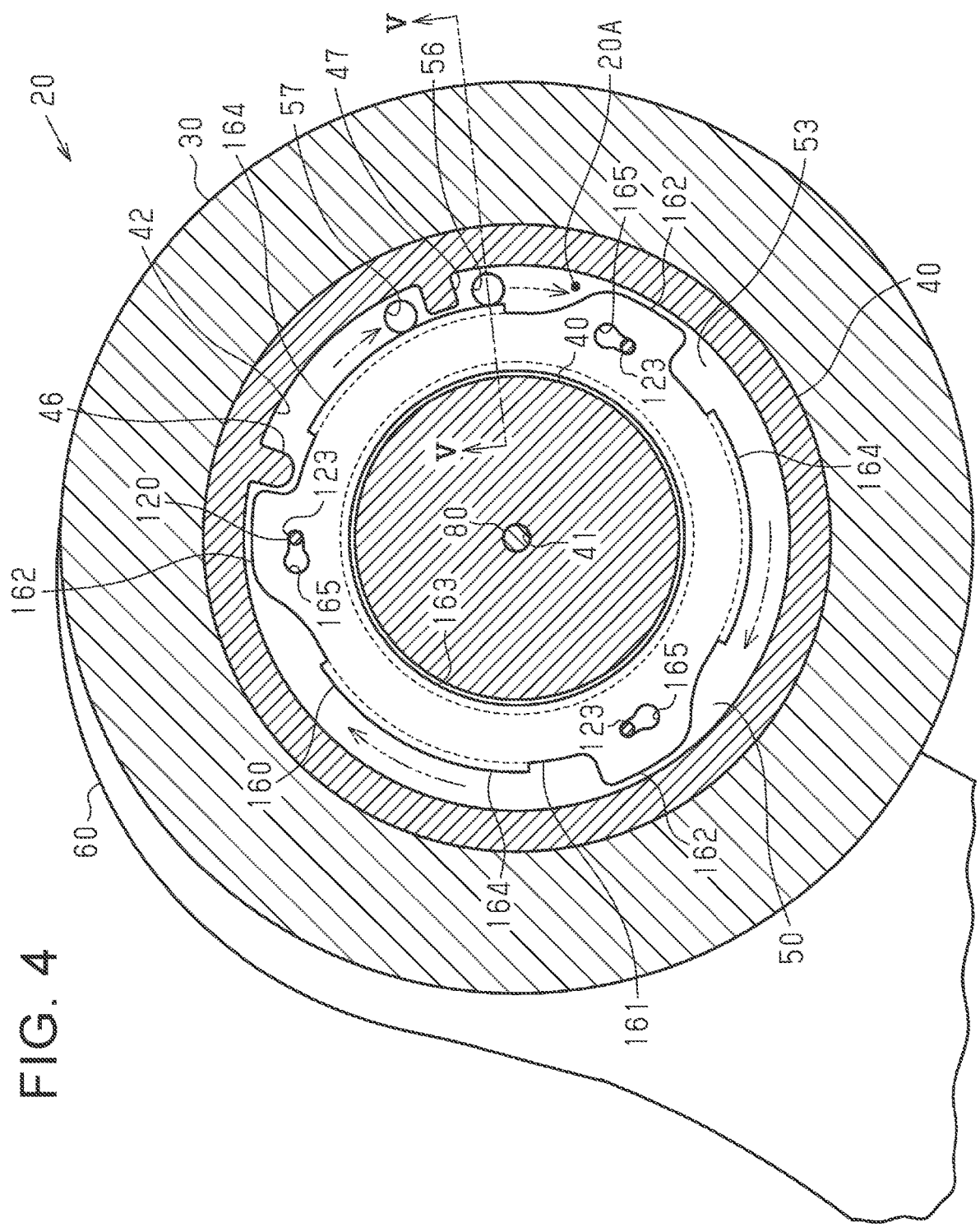
FIG. 4 is a cross-sectional view taken along line IV-IV in FIG. 2.
Figure 5:
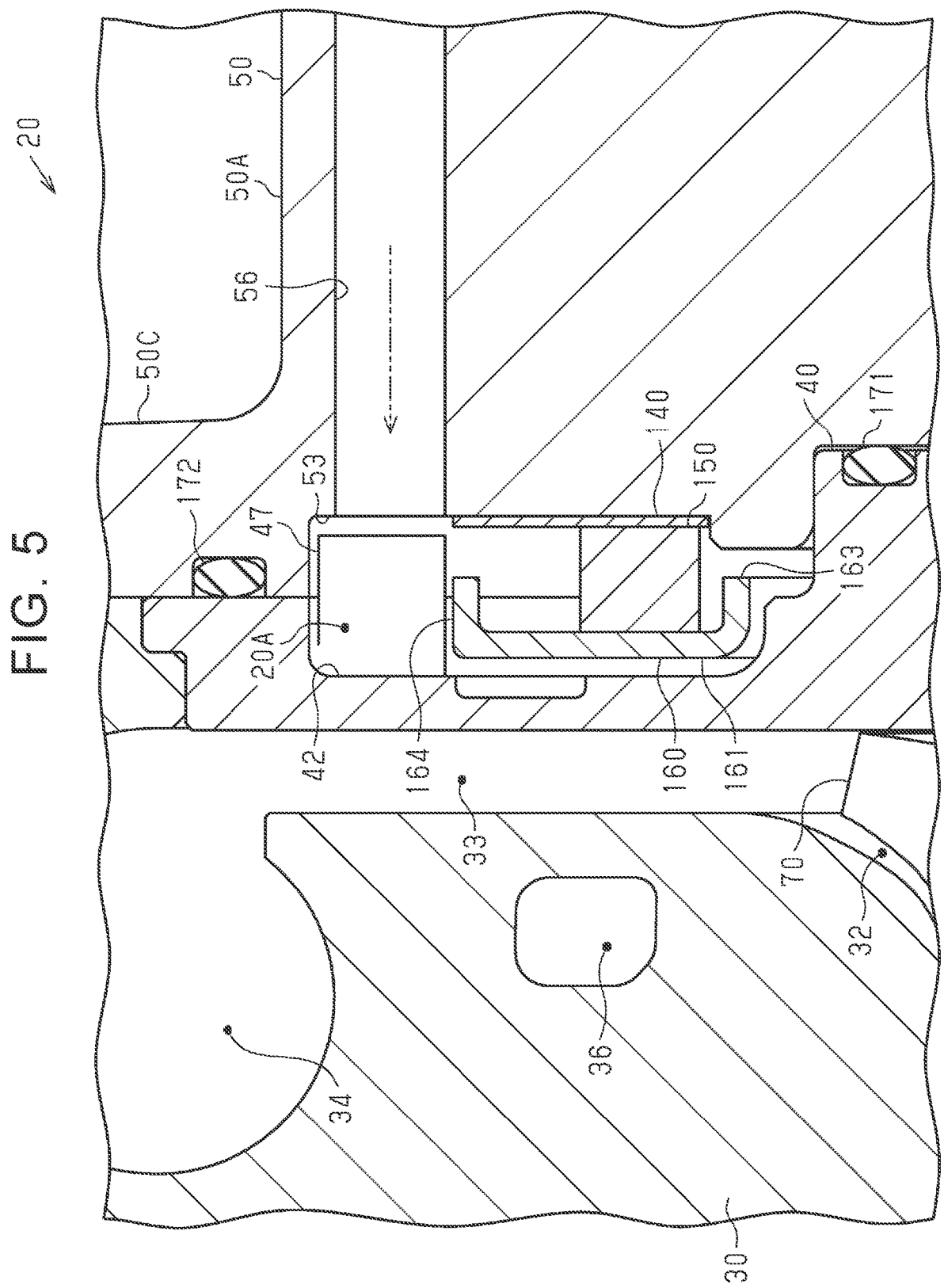
FIG. 5 is a cross-sectional view taken along line V-V in FIG. 4.

As shown in FIG. 4, the bearing housing 50 defines an introduction hole 56 and a discharge hole 57. As shown in FIG. 5, the introduction hole 56 is open to the bottom of the recessed portion 53. The opening of the introduction hole 56 is located in the vicinity of the outer edge of the recessed portion 53. The introduction hole 56 is connected to an introduction pipe (not shown) connected to the bearing housing 50. The introduction hole 56 allows a coolant to be introduced into the recessed portion 53. As shown in FIG. 4, the discharge hole 57 is open to a portion of the bottom of the recessed portion 53 in the vicinity of the introduction hole 56. The opening of the discharge hole 57 is located in the vicinity of the outer edge of the recessed portion 53. The discharge hole 57 is connected to a discharge pipe (not shown) connected to the bearing housing 50. The discharge hole 57 allows the coolant introduced into the recessed portion 53 to be discharged. One example of the coolant is cooling water.

As shown in FIG. 2, each of the through-holes 54 extends from the bottom of the recessed portion 53 to an end face of the housing body 50A closer to the turbine housing 60, in the rotation-axis direction. When viewed in the rotation-axis direction, the three through-holes 54 are located in the same portions as the three insertion holes 111A of the variable nozzle mechanism 110. When viewed in the rotation-axis direction, each through-hole 54 has a generally round shape.

As shown in FIG. 3, the through-hole 54 includes a holding space 54A and a connecting space 54B. The holding space 54A is a part of the through-hole 54 including an end closer to the compressor housing 30. Namely, the holding space 54A communicates with the recessed portion 53. The connecting space 54B is space of the through-hole 54 other than the holding space 54A. The inside diameter of the connecting space 54B is substantially equal to the inside diameter of the insertion hole 111A of the variable nozzle mechanism 110, and is smaller than the inside diameter of the holding space 54A.

As shown in FIG. 2, the seal plate 40 is fixed to an end face of the housing body 50A of the bearing housing 50 closer to the compressor housing 30. The seal plate 40 is in the form of a generally round plate. The outside diameter of the seal plate 40 is larger than the outside diameter of the housing body 50A of the bearing housing 50, and is smaller than the outside diameter of the second flange 50C of the bearing housing 50. The seal plate 40 is fixed to a generally central portion of the housing body 50A of the bearing housing 50 with bolts (not shown).

The seal plate 40 includes an insertion hole 41 and a recessed portion 42. The insertion hole 41 extends through the seal plate 40 in the rotation-axis direction. When viewed in the rotation-axis direction, the insertion hole 41 is located substantially in the middle of the seal plate 40. The connecting shaft 80 is inserted through the insertion hole 41. The recessed portion 42 is recessed from an end face of the seal plate 40 closer to the bearing housing 50, toward the compressor housing 30. The recessed portion 42 has a generally annular shape surrounding the rotation axis 90A. When viewed in the rotation-axis direction, the recessed portion 42 is located in the same portion as the recessed portion 53 of the bearing housing 50. Thus, in this embodiment, the seal plate 40 and the bearing housing 50 cooperate with each other to define space between the recessed portion 42 of the seal plate 40 and the recessed portion 53 of the bearing housing 50, as a cooling chamber 20A. The entire area of the cooling chamber 20A is located radially outward of the compressor wheel 70. Since the recessed portion 42 of the seal plate 40 and the recessed portion 53 of the bearing housing 50 have a generally annular shape, the cooling chamber 20A has a generally annular shape.

As shown in FIG. 4, the seal plate 40 includes a fixed protrusion 46 and a partition 47. The fixed protrusion 46 protrudes radially inward from an inner circumferential surface of the recessed portion 42 on the radially outer side. When viewed in the rotation-axis direction, the fixed protrusion 46 is located in the vicinity of one of the three through-holes 54 of the bearing housing 50.

As shown in FIG. 5, the partition 47 protrudes from the bottom of the recessed portion 42 toward the turbine housing 60. A distal end of the partition 47 is located close to the bottom of the recessed portion 53 of the bearing housing 50. As shown in FIG. 4, when viewed in the rotation-axis direction, the partition 47 is located between the introduction hole 56 and discharge hole 57 of the bearing housing 50.

As shown in FIG. 3, the turbocharger 20 includes a radially inner seal 171 and a radially outer seal 172. The radially inner seal 171 has a generally annular shape surrounding the rotation axis 90A. The radially inner seal 171 is located between the housing body 50A of the bearing housing 50 and the seal plate 40. The radially inner seal 171 is located radially inward of the cooling chamber 20A. Thus, the radially inner seal 171 seals a radially inner portion of the cooling chamber 20A.

The radially outer seal 172 has a generally annular shape surrounding the rotation axis 90A. The radially outer seal 172 is located between the second flange 50C of the bearing housing 50 and the seal plate 40. The radially outer seal 172 is located radially outward of the cooling chamber 20A. Thus, the radially outer seal 172 seals a radially outer portion of the cooling chamber 20A.

As shown in FIG. 2, the compressor housing 30 includes a cylindrical portion 30A and an arc portion 30B. The cylindrical portion 30A has a generally cylindrical shape. The cylindrical portion 30A extends along the rotation axis 90A. The arc portion 30B extends around the outer periphery of the cylindrical portion 30A, and has a generally arc-like shape.

The compressor housing 30 defines an introduction passage 31, housing space 32, connecting passage 33, and scroll passage 34, as space through which intake air flows. The introduction passage 31 is a part of the interior space of the cylindrical portion 30A including an end opposite to the seal plate 40, namely, the left end in FIG. 2. The upstream end of the introduction passage 31 is connected to the intake passage 11 on the upstream side of the compressor housing 30. The downstream end of the introduction passage 31 is connected to the housing space 32. The housing space 32 is a part of the internal space of the cylindrical portion 30A other than the introduction passage 31. The housing space 32 houses the compressor wheel 70.

The scroll passage 34 is located within the arc portion 30B. The scroll passage 34 extends in the circumferential direction so as to surround the compressor wheel 70. The downstream end of the scroll passage 34 is connected to the intake passage 11 on the downstream side of the compressor housing 30. The connecting passage 33 is located between the cylindrical portion 30A of the compressor housing 30 and the seal plate 40, and is defined by the cylindrical portion 30A and the seal plate 40. The connecting passage 33 is located between the housing space 32 and the scroll passage 34, and connects the housing space 32 with the scroll passage 34. When viewed in the rotation-axis direction, the connecting passage 33 has a generally annular shape.

The compressor housing 30 defines a cooling passage 36, as space through which coolant flows. The cooling passage 36 is located in a portion of the cylindrical portion 30A which is close to the connecting passage 33. The cooling passage 36 has a generally annular shape surrounding the compressor wheel 70. The cooling passage 36 is connected to a supply passage (not shown) connected to the compressor housing 30. Then, the coolant flows into the cooling passage 36, via the supply passage. As a result, the cylindrical portion 30A, etc. are cooled by heat exchange with the coolant flowing through the cooling passage 36.

As shown in FIG. 3, the turbocharger 20 includes three penetrating shafts 120, seal members 130, holding plate 140, spring member 150, and fixing member 160. Each of the penetrating shafts 120 is inserted through a corresponding one of the through-holes 54. Thus, the three penetrating shafts 120 are located on a circumference about the rotation axis 90A. Also, the three penetrating shafts 120 are positioned to be spaced equiangularly in the circumferential direction about the rotation axis 90A.

As shown in FIG. 2 and FIG. 3, the penetrating shaft 120 includes a head portion 121, large-diameter portion 122, small-diameter portion 123, and fixed end portion 124. The large-diameter portion 122 has a solid, generally cylindrical shape. The outside diameter of the large-diameter portion 122 is substantially equal to the inside diameter of the connecting space 54B of the through-hole 54 of the bearing housing 50. The large-diameter portion 122 is inserted through the through-hole 54 of the bearing housing 50 and the insertion hole 111A of the variable nozzle mechanism 110.

The head portion 121 is located at a first end of the large-diameter portion 122. The head portion 121 has a generally disc-like shape. The outside diameter of the head portion 121 is larger than the outside diameter of the large-diameter portion 122. The head portion 121 is connected to the support member 111. Namely, the penetrating shaft 120 is connected to the variable nozzle mechanism 110.

As shown in FIG. 3, the small-diameter portion 123 is located at a second end of the large-diameter portion 122. The small-diameter portion 123 has a solid, generally cylindrical shape. The outside diameter of the small-diameter portion 123 is smaller than the outside diameter of the large-diameter portion 122.

The fixed end portion 124 is located at an end of the small-diameter portion 123 opposite to the large-diameter portion 122. The fixed end portion 124 has a generally disc-like shape. The outside diameter of the fixed end portion 124 is larger than the outside diameter of the small-diameter portion 123, and is substantially equal to the outside diameter of the large-diameter portion 122.

The seal member 130 is located in the holding space 54A of the bearing housing 50. The seal member 130 has a generally annular shape surrounding the large-diameter portion 122 of the penetrating shaft 120. Thus, the seal member 130 seals a gap between the outer circumferential surface of the large-diameter portion 122 of the penetrating shaft 120 and the inner circumferential wall of the holding space 54A of the through-hole 54.

The holding plate 140 is located on the bottom of the recessed portion 53 of the bearing housing 50. The holding plate 140 has a generally annular shape surrounding the rotation axis 90A. The holding plate 140 covers the holding space 54A of the through-hole 54. The holding plate 140 includes an insertion hole 141. The insertion hole 141 extends through the holding plate 140 in the rotation-axis direction. When viewed in the rotation-axis direction, the insertion hole 141 is located in the same portion as the through-hole 54. The inside diameter of the insertion hole 141 is smaller than the inside diameter of the holding space 54A of the through-hole 54, and is slightly larger than the outside diameter of the large-diameter portion 122 of the penetrating shaft 120. Thus, the seal member 130 is sandwiched in the rotation-axis direction, between an end face of the holding plate 140 closer to the turbine housing 60, and an inner wall of the holding space 54A of the through-hole 54. Namely, the holding plate 140 holds the seal member 130. Also, the holding space 54A communicates with the cooling chamber 20A, via a clearance between the inner circumferential wall of the insertion hole 141 of the holding plate 140 and the outer circumferential surface of the large-diameter portion 122 of the penetrating shaft 120.

The spring member 150 is located in the cooling chamber 20A. The spring member 150 has a generally annular shape surrounding the rotation axis 90A. Namely, the axial direction of the spring member 150 coincides with the rotation-axis direction. The spring member 150 is located closer to the compressor housing 30 than the holding plate 140. The spring member 150 is located radially inward of the penetrating shaft 120, namely, located in a portion closer to the rotation axis 90A than the penetrating shaft 120. An end face of the spring member 150 closer to the turbine housing 60 abuts against an end face of the holding plate 140 closer to the compressor housing 30. The spring member 150 is in a condition where it is compressed in the rotation-axis direction. One example of the spring member 150 is a coiled wave spring. In FIG. 3 and FIG. 5, the spring member 150 is illustrated with its shape simplified.

As shown in FIG. 3, the fixing member 160 is located in the cooling chamber 20A. As shown in FIG. 4, the fixing member 160 includes an annular portion 161, three protruding portions 162, and three fixing holes 165. Also, as shown in FIG. 4 and FIG. 5, the fixing member 160 includes a radially inner erected portion 163, and three radially outer erected portions 164.

As shown in FIG. 4, the annular portion 161 is in the form of a generally annular plate surrounding the rotation axis 90A. The inside diameter of the annular portion 161 is slightly smaller than the inside diameter of the spring member 150. The outside diameter of the annular portion 161 is slightly larger than the outside diameter of the spring member 150. When viewed in the rotation-axis direction, the annular portion 161 is located in the same portion as the spring member 150. An end face of the annular portion 161 closer to the turbine housing 60 abuts against an end face of the spring member 150 closer to the compressor housing 30. Thus, the spring member 150 pushes out the fixing member 160 toward the compressor housing 30.

The protruding portions 162 protrude radially outward from the outer edge of the annular portion 161. When viewed in the rotation-axis direction, the protruding portions 162 are spaced from each other in the circumferential direction, and are located in the same portions as the three insertion holes 111A of the variable nozzle mechanism 110. Also, one of the three protruding portions 162 is located in the vicinity of the fixed protrusion 46 of the seal plate 40. When viewed in the rotation-axis direction, the fixed protrusion 46 of the seal plate 40 is located adjacent to the above protruding portion 162 in a first circumferential direction, namely, in a clockwise direction in FIG. 4.

As shown in FIG. 4, the fixing holes 165 extend through the annular portion 161 and protruding portion 162 in the rotation-axis direction. Each of the fixing holes 165 is in the form of a generally elongate hole that extends in the circumferential direction. The inside diameter of a portion of the fixing hole 165 located in the first circumferential direction, namely, in the clockwise direction in FIG. 4, is substantially equal to the outside diameter of the small-diameter portion 123 of the penetrating shaft 120, and is smaller than the outside diameter of the fixed end portion 124 of the penetrating shaft 120. The inside diameter of a portion of the fixing hole 165 located in a second circumferential direction, namely, in the counterclockwise direction in FIG. 4, is larger than the inside diameter of the portion of the fixing hole 165 located in the first circumferential direction, and is larger than the outside diameter of the fixed end portion 124 of the penetrating shaft 120. The small-diameter portion 123 of the penetrating shaft 120 is inserted through the portion of the fixing hole 165 of the fixing member 160 located in the first circumferential direction.

As shown in FIG. 3, the fixed end portion 124 of the penetrating shaft 120 abuts against end faces of the annular portion 161 and protruding portion 162 of the fixing member 160 closer to the compressor housing 30. Also, as described above, the spring member 150 pushes out the fixing member 160 toward the compressor housing 30. Thus, one spring member 150 pushes out the three penetrating shafts 120 toward the compressor housing 30, via the fixing member 160. Accordingly, the variable nozzle mechanism 110 is positioned in the scroll passage 34 of the turbine housing 60.

The fixing member 160 and the seal plate 40 are mounted in the following manner. Initially, the fixed end portions 124 of the penetrating shafts 120 are inserted, through the portions of the fixing holes 165 of the fixing member 160 located in the second circumferential direction. Then, the fixing member 160 is rotated in the second circumferential direction, namely, in the counterclockwise direction in FIG. 4, relative to the penetrating shafts 120, so that the small-diameter portions 123 of the penetrating shafts 120 are inserted through the portions of the fixing holes 165 of the fixing member 160 located in the first circumferential direction. Further, the seal plate 40 is fixed to the bearing housing 50, so that the fixed protrusion 46 of the seal plate 40 is located adjacent to one of the three protruding portions 162 in the first circumferential direction, namely, in the clockwise direction in FIG. 4, as viewed in the rotation-axis direction. As a result, in a condition where the seal plate 40 is fixed to the bearing housing 50, the fixed protrusion 46 of the seal plate 40 and the protruding portion 162 of the fixing member 160 abut against each other, so that the fixing member 160 is prevented from rotating in the first circumferential direction, namely, in the clockwise direction in FIG. 4, relative to the penetrating shafts 120.

As shown in FIG. 3, the radially inner erected portion 163 protrudes from the inner edge of the annular portion 161 toward the turbine housing 60. The radially inner erected portion 163 extends over the entire length of the inner edge of the annular portion 161, and has a generally annular shape. The radially inner erected portion 163 is located radially inward of the spring member 150.

As shown in FIG. 5, the radially outer erected portions 164 protrude from the outer edge of the annular portion 161 toward the turbine housing 60. As shown in FIG. 4, each of the radially outer erected portions 164 is located between two protruding portions 162 arranged in the circumferential direction, as parts of the outer edge of the annular portion 161. One of the three radially outer erected portions 164 is located close to the partition 47 of the seal plate 40.

Next, the operation of this embodiment will be described. When the coolant is introduced from the introduction hole 56 of the bearing housing 50 into the cooling chamber 20A, as indicated by an arrow of a two-dot chain line in FIG. 5, the coolant is guided in the first circumferential direction, namely, in the clockwise direction in FIG. 4, by the partition 47 and the radially outer erected portions 164, as indicated by arrows of two-dot chain lines in FIG. 4. Then, the coolant in the cooling chamber 20A flows in the first circumferential direction. The coolant that flows through the cooling chamber 20A is discharged from the discharge hole 57 of the bearing housing 50. As a result, the penetrating shafts 120, seal plate 40, etc. are cooled by heat exchange with the coolant flowing through the cooling chamber 20A.

Next, the effects of this embodiment will be described. (1) In the turbocharger 20, if the space that houses the spring member 150 is provided separately from the cooling chamber 20A, the turbocharger 20 may be large-sized due to the presence of the space and the cooling chamber 20A.

In this respect, in this embodiment, the spring member 150 is located within the cooling chamber 20A, as shown in FIG. 3. Thus, the space that houses the spring member 150 can be effectively utilized as the cooling chamber 20A, which makes it unnecessary to newly provide a cooling chamber in the compressor housing 30 and seal plate 40. Accordingly, the turbocharger 20 is less likely or unlikely to be large-sized, as compared with the case where the cooling chamber 20A and the space that houses the spring member 150 are provided separately.

(2) In this embodiment, the spring member 150 is a coiled wave spring. Generally, the axial dimension of a coiled wave spring is smaller than that of a coil spring, for example. Also, generally, change of force according to the amount of elastic deformation of the coiled wave spring is smaller than that of a disc spring, for example; therefore, the force applied to an object can be easily adjusted. Accordingly, in the turbocharger 20, it is possible to curve increase in the size of the turbocharger 20 in the axial direction of the spring member 150, namely, in the rotation-axis direction, while assuring sufficiently large force applied from the spring member 150 to the penetrating shafts 120.

(3) In this embodiment, a single spring member 150 can push out all of the penetrating shafts 120; therefore, the number of components is prevented from being increased due to provision of two or more spring members 150, for example. Also, the spring member 150, which surrounds the rotation axis 90A, is likely to have a large diameter. As a result, sufficiently large elastic force of the spring member 150 is more easily ensured, as compared with the arrangement in which the spring member 150 does not surround the rotation axis 90A.

(4) The seal member 130 is located between the outer circumferential surface of the large-diameter portion 122 of the penetrating shaft 120, and the inner circumferential wall of the through-hole 54 of the bearing housing 50. Thus, it is possible to reduce the amount of exhaust gas that flows from the turbine housing 60 to the compressor housing 30, via a clearance between the outer circumferential surface of the large-diameter portion 122 of the penetrating shaft 120 and the inner circumferential wall of the through-hole 54 of the bearing housing 50.

(5) The seal member 130 is located in the holding space 54A that communicates with the cooling chamber 20A. Since the holding space 54A communicates with the cooling chamber 20A, a part of the coolant that flows through the cooling chamber 20A flows into the holding space 54A. Thus, the seal member 130 can be cooled by heat exchange with the coolant flowing into the holding space 54A.

(6) The seal member 130 is sandwiched in the rotation-axis direction, between the end face of the holding plate 140 closer to the turbine housing 60 and the inner wall of the holding space 54A of the through-hole 54. Thus, the seal member 130 abuts against the holding plate 140, so that the seal member 130 is prevented from being displaced to be closer to the compressor housing 30. As a result, it is possible to prevent a situation where the sealing effect of the seal member 130 cannot be obtained, due to displacement of the seal member 130 from the holding space 54A to the cooling chamber 20A.

(7) In the turbocharger 20, when the intake air in the compressor housing 30 is compressed by rotation of the compressor wheel 70, the temperature of the intake air in the connecting passage 33 is elevated. Then, as the temperature of the intake air in the connecting passage 33 rises, the temperature of a portion of the seal plate 40 located radially outward of the compressor wheel 70 is likely to rise.

In this respect, the entire region of the cooling chamber 20A is located radially outward of the compressor wheel 70. Thus, the temperature of the portion of the seal plate 40 located radially outward of the compressor wheel 70 is less likely or unlikely to be elevated, due to heat exchange with the coolant flowing through the cooling chamber 20A.

(8) In this embodiment, the radially inner erected portion 163 is located radially inward of the spring member 150. Accordingly, radial movement of the spring member 150 is restricted by the radially inner erected portion 163. Thus, excessive displacement of the spring member 150 is prevented.

(9) In this embodiment, the partition 47 exists between the introduction hole 56 and the discharge hole 57. Then, the partition 47 and the radially outer erected portions 164 define a passage that extends in the circumferential direction. Thus, the coolant supplied into the cooling chamber 20A flows in the circumferential direction in the cooling chamber 20A, and is likely to spread over the entire cooling chamber 20A.

This embodiment may be modified as follows and implemented. This embodiment and modified examples below may be combined within a technically compatible range.

In the following, modified examples of the spring member will be described. In the illustrated embodiment, the spring member 150 is not limited to the coiled wave spring. For example, a disc spring and a coil spring may be employed as the spring member 150. With this arrangement, too, the turbocharger is less likely or unlikely to be large-sized if the spring member 150 is located within the cooling chamber 20A.

In the illustrated embodiment, the number of spring member(s) 150 is not necessarily one, but may be two or more. For example, one spring member 150 may be provided for one penetrating shaft 120.

In the following, modified examples of the penetrating shafts will be described. In the illustrated embodiment, the positional relationship of the penetrating shafts 120 may be changed. For example, the penetrating shafts 120 may not be necessarily positioned to be spaced equiangularly in the circumferential direction about the rotation axis 90A. Nonetheless, it is preferable to arrange the penetrating shafts 120 at intervals of an equal angle about the rotation axis 90A, so that the variable nozzle mechanism 110 can be stably positioned by the penetrating shafts 120.

In the illustrated embodiment, the number of the penetrating shafts 120 can be changed. For example, the number of the penetrating shafts 120 may be two or less, or four or more. Further, two or more penetrating shafts 120 may not be necessarily provided, but there may be one penetrating shaft.

Next, a modified example of the holding plate will be described. In the illustrated embodiment, the holding plate 140 may be omitted. For example, if the seal member 130 is not likely to be displaced in the rotation-axis direction, the holding plate 140 may be omitted. In a specific example, an annular groove may be provided in the outer circumferential surface of the penetrating shaft 120, and the seal member 130 may be mounted in the groove, so that displacement of the seal member 130 is curbed.

Next, a modified example of the holding space will be described. In the illustrated embodiment, the holding space 54A may not communicate with the cooling chamber 20A. In a specific example, the holding space 54A may exchange heat with the coolant flowing through the cooling chamber 20A, through heat transmission via the holding plate 140, even if the holding space 54A does not communicate with the cooling chamber 20A, via the clearance between the inner circumferential wall of the insertion hole 141 of the holding plate 140 and the outer circumferential surface of the large-diameter portion 122 of the penetrating shaft 120.

Next, modified examples of the seal member will be described. In the illustrated embodiment, the position of the seal member 130 may be changed. For example, the seal member 130 may be located in an end portion of the through-hole 54 closer to the turbine housing 60, if it can seal a clearance between the outer circumferential surface of the large-diameter portion 122 of the penetrating shaft 120 and the inner circumferential wall of the holding space 54A of the through-hole 54.

In the illustrated embodiment, the seal member 130 may be omitted. When the clearance between the outer circumferential surface of the large-diameter portion 122 of the penetrating shaft 120 and the inner circumferential wall of the holding space 54A of the through-hole 54 is relatively small, the seal member 130 may be omitted, without causing a major influence.

Next, modified examples of the cooling chamber will be described. In the illustrated embodiment, the shape of the cooling chamber 20A may be changed. For example, the cooling chamber 20A may not be located radially outward of the compressor wheel 70. Nonetheless, it is preferable that at least a part of the cooling chamber 20A is located radially outward of the compressor wheel 70, so as to cool a portion of the seal plate 40 located radially outward of the compressor wheel 70.

Also, the cooling chamber 20A does not necessarily have a generally annular shape, but the cooling chamber 20A may have an arc-like shape, for example. Nonetheless, it is preferable that the cooling chamber 20A has a generally annular shape, so as to efficiently cool the penetrating shafts 120, etc. located around the rotation axis 90A.

To provide the cooling chamber 20A, the shapes of the seal plate 40 and the bearing housing 50 may be changed as needed. Thus, the recessed portion 42 of the seal plate 40 and the recessed portion 53 of the bearing housing 50 may be omitted, provided that the cooling chamber 20A can be defined between the seal plate 40 and the bearing housing 50.

Next other modified examples will be described. In the illustrated embodiment, the shape of the fixing member 160 may be changed. For example, the radially inner erected portion 163 of the fixing member 160 may be omitted. Also, for example, the radially outer erected portions 164 of the fixing member 160 may be omitted. With this arrangement, too, the coolant introduced from the introduction hole 56 into the cooling chamber 20A substantially flows toward the discharge hole 57; therefore, the penetrating shafts 120, etc. can be cooled by heat exchange with the coolant, if a relatively large amount of coolant flows through the cooling chamber 20A.

In the illustrated embodiment, the fixing member 160 may be omitted. For example, if the spring member 150 is directly mounted on the penetrating shaft 120, the fixing member 160 may be omitted. In the illustrated embodiment, the shape of the seal plate 40 may be changed. For example, the fixed protrusion 46 may be omitted. Also, for example, the partition 47 may be omitted. When the partition 47 is omitted, a partition that protrudes from the bottom of the recessed portion 53 of the bearing housing 50 is preferably provided, for adjusting flow of the coolant.

What is claimed is:

1. A turbocharger comprising:
a turbine wheel configured to rotate by flow of exhaust gas;
a turbine housing that houses the turbine wheel;
a bearing housing fixed to the turbine housing;
a compressor housing fixed to the bearing housing;
a seal plate located between the bearing housing and the compressor housing;
a variable nozzle mechanism located within the turbine housing, and configured to adjust an amount of the exhaust gas that flows toward the turbine wheel;
a penetrating shaft that extends through the bearing housing and is connected to the variable nozzle mechanism; and
a spring member configured to push out the penetrating shaft toward the compressor housing,
wherein the bearing housing and the seal plate are configured to define a cooling chamber through which a coolant flows, and
wherein the spring member is located in the cooling chamber.

2. The turbocharger according to claim 1, wherein:
the compressor housing houses a compressor wheel connected to the turbine wheel; and
at least a part of the cooling chamber is located outward of the compressor wheel, in a radial direction perpendicular to a rotation axis of the turbine wheel.

3. The turbocharger according to claim 1, wherein the spring member comprises a coiled wave spring.

4. The turbocharger according to claim 3, wherein:
a plurality of the penetrating shafts is provided on a circumference about a rotation axis of the turbine wheel; and
the coiled wave spring surrounds the rotation axis, and the coiled wave spring is configured to push out all of the penetrating shafts toward the compressor housing.

5. The turbocharger according to claim 4, wherein all of the penetrating shafts are positioned to be spaced equiangularly in a circumferential direction about the rotation axis.

6. The turbocharger according to claim 1, wherein:
the bearing housing includes a through-hole through which the penetrating shaft is inserted; and
a seal member that seals a clearance between the penetrating shaft and the through-hole is located between an outer circumferential surface of the penetrating shaft and an inner circumferential wall of the through-hole.

7. The turbocharger according to claim 6, wherein:
the bearing housing is configured to define a holding space that holds the seal member; and
the holding space communicates with the cooling chamber.

8. The turbocharger according to claim 7, wherein the cooling chamber has a generally annular shape.

9. The turbocharger according to claim 7, wherein:
a holding plate that holds the seal member is mounted on the bearing housing; and
the seal member is sandwiched between an inner wall of the holding space and an end face of the holding plate.

* * * * *